(12) United States Patent
Hu et al.

(10) Patent No.: US 12,547,278 B1
(45) Date of Patent: Feb. 10, 2026

(54) DRIVING METHOD, DRIVING DEVICE FOR TOUCH PANEL, AND DISPLAY APPARATUS HAVING LOW POWER WAKE-UP GESTURE MODE

(71) Applicant: Guangzhou China Star Optoelectronics Semiconductor Display Technology Co., LTd., Guangdong (CN)

(72) Inventors: Xin Hu, Guangdong (CN); Xiaohai Chen, Guangdong (CN); Sunqi Lou, Guangdong (CN)

(73) Assignee: Guangzhou China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 18/900,796

(22) Filed: Sep. 29, 2024

(30) Foreign Application Priority Data

Aug. 12, 2024 (CN) .......................... 202411105552.9

(51) Int. Cl.
*G06F 3/041* (2006.01)
(52) U.S. Cl.
CPC ...... *G06F 3/04184* (2019.05); *G06F 3/04166* (2019.05)

(58) Field of Classification Search
CPC .......................... G06F 3/04184; G06F 3/04166
See application file for complete search history.

(56) References Cited

U.S. PATENT DOCUMENTS

| | | | |
|---|---|---|---|
| 2015/0296164 A1* | 10/2015 | Hirai ................... | H04N 25/7795 348/308 |
| 2016/0224175 A1* | 8/2016 | Moon .................... | G06F 3/0412 |
| 2018/0059838 A1* | 3/2018 | Chung ................. | G09G 3/3688 |
| 2020/0019270 A1* | 1/2020 | Shin ....................... | G06F 1/3262 |

* cited by examiner

*Primary Examiner* — Afroza Chowdhury
(74) *Attorney, Agent, or Firm* — PV IP PC; Peter S. Stecher; Wei Te Chung

(57) ABSTRACT

A driving method and a driving device for a touch panel, and a display apparatus are provided, featuring a low power wake-up gesture mode. In this mode, the touch panel includes a first stage for touch scanning and a subsequent second phase for pulling up the signal potential. The method involves responding to confirmation of the touch panel transitioning from the first stage to the second stage by controlling a reset signal and a low voltage signal to switch to first level signals, and controlling the start pulse signal, clock signal, and latch signal to switch to second level signals, where the voltage of the first level signal is higher than that of the second level signal. This configuration can reduce disturbances from high voltage signals to the touch scanning signal, improve issues related to failed wake-ups or accidental wake-ups, and enhance the product usage experience.

17 Claims, 6 Drawing Sheets

In response to confirming the transition of the touch panel from the first stage to the second stage, control the reset signal and the low voltage signal provided to the gate driver circuit to switch to first level signals ~401

Control the start pulse signal, the clock signal, and the latch signals provided to the gate driver circuit to switch to second level signals, where the voltage of the first level signal is higher than the voltage of the second level signal ~402

FIG. 4

DRIVING METHOD, DRIVING DEVICE FOR TOUCH PANEL, AND DISPLAY APPARATUS HAVING LOW POWER WAKE-UP GESTURE MODE

FIELD OF DISCLOSURE

The present application relates to the field of display technology, specifically concerning a driving method and a driving device for a touch panel, and a display apparatus.

DESCRIPTION OF RELATED ART

As display devices continue to develop, their functionalities are also expanding. In the low-power wake-up gesture (LPWG) mode of display devices, touch scanning can still be performed even when the screen is off, using pre-set gestures to activate specific functions. However, in amorphous silicon (a-Si) liquid crystal display (LCD) devices, the touch scanning signals are susceptible to disturbances, generating touch noise that adversely affects the touch scanning performance in LPWG mode. This can lead to failed wake-ups, thus degrading the user experience with the display device.

SUMMARY OF INVENTION

The present application provides a driving method and a driving device for a touch panel, and a display apparatus, designed to improve the common wake-up failures in the low power wake-up gesture (LPWG) mode of the display apparatus, thereby enhancing the user experience.

In order to address the above technical issues, the present application provides the following technical solutions.

In a first aspect, the present application provides a driving method for a touch panel, wherein the touch panel comprises a low power wake-up gesture (LPWG) mode; in the LPWG mode, the touch panel includes a first stage and a second stage after the first stage, the first stage is a stage for touch scanning, the second stage is a stage for elevating signal potential, and the touch panel comprises a gate driver circuit; the driving method includes:

in response to confirmation of the touch panel transitioning from the first stage to the second stage, controlling a reset signal and a low voltage signal provided to the gate driver circuit to each switch to a first level signal; and controlling a start pulse signal, a clock signal, and a latch signal provided to the gate driver circuit to each switch to a second level signal, where a voltage of the first level signal is greater than a voltage of the second level signal.

Based on the first aspect, the driving method further includes:

in response to confirmation of the touch panel transitioning from the third stage to the first stage, controlling the reset signal, the low voltage signal, the start pulse signal, the clock signal, and the latch signal to each switch to a first scanning signal, wherein the first scanning signal is a superimposed combination of a touch scanning signal and the second level signal.

Based on the first aspect, the driving method further includes:

in response to confirmation of the touch panel transitioning from the third stage to the first stage, controlling a data signal provided to the touch panel and a common voltage signal provided to the touch panel to each switch to a second scanning signal, wherein the second scanning signal is a superimposed combination of the touch scanning signal and a third level signal, and a voltage of the third level signal is greater than the voltage of the second level signal and less than the voltage of the first level signal.

Based on the first aspect, the touch scanning signal is a pulse square wave signal.

Based on the first aspect, the touch panel in the LPWG mode further includes a sleep stage, and the sleep stage is before the initial third stage; the driving method further includes:

in response to confirmation that the touch panel transitioning from the sleep stage to the third stage, controlling the reset signal, the low voltage signal, the start pulse signal, the clock signal, and the latch signal to each switch to the second level signal.

Based on the first aspect, the driving method further includes:

in response to the touch panel entering the sleep stage, controlling the reset signal, the low voltage signal, the start pulse signal, the clock signal, and the latch signal to each switch to a third level signal, wherein a voltage of the third level signal is greater than the voltage of the second level signal and less than the voltage of the first level signal.

Based on the first aspect, the driving method further includes:

in response to the touch panel entering the sleep stage, controlling a data signal provided to the touch panel and a common voltage signal provided to the touch panel to each switch to the third level signal; and in response to confirmation of the touch panel transitioning from the sleep stage to the third stage, or in response to confirmation of the touch panel transitioning from the first stage to the second stage, or in response to confirmation of the touch panel transitioning from the second stage to the third stage, controlling the data signal provided to the touch panel and the common voltage signal provided to the touch panel to be each maintained as the third level signal.

Based on the first aspect, the first level signal is a positive voltage signal, the second level signal is a negative voltage signal, and the third level signal is a ground signal.

In a second aspect, the present application provides a driving device for a touch panel, wherein the touch panel includes a low power wake-up gesture (LPWG) mode; in the LPWG mode, the touch panel includes a first stage and a second stage after the first stage, the first stage is a stage for touch scanning, the second stage is a stage for elevating signal potential, and the touch panel comprises a gate driver circuit; the driving device includes:

a first timing control module that, in response to confirmation of the touch panel transitioning from the first stage to the second stage, controls a reset signal and a low voltage signal provided to the gate driver circuit to each switch to a first level signal; and a second timing control module that controls a start pulse signal, a clock signal, and a latch signal provided to the gate driver circuit to each switch to a second level signal, wherein a voltage of the first level signal is greater than a voltage of the second level signal.

In a third aspect, the present application provides a display apparatus, including a touch panel and a driving device for the touch panel as described in the second aspect.

One technical solution among those disclosed has the following advantages or beneficial effects:

Compared to conventional technology, a driving method for a touch panel is provided in this application. The touch panel includes a low power wake-up gesture (LPWG) mode. Under the LPWG mode, the touch panel includes a first stage for touch scanning and a subsequent second stage for elevating signal potential. The touch panel includes a gate driver circuit. The driving method involves: in response to the confirmation of the touch panel transitioning from the first stage to the second stage, controlling the reset signal and the low voltage signal provided to the gate driver circuit to switch to a first level signal; and controlling the start pulse signal, the clock signal, and the latch signals to switch to a second level signal, where the voltage of the first level signal is higher than the voltage of the second level signal. This method can achieve the discharge of charges during the second stage via the reset signal and the low voltage signal to prevent screen flashing when the screen is illuminated after the LPWG mode, while also reducing disturbances from high voltage signals to the touch scanning signals, thereby enhancing the touch scanning accuracy of the LPWG mode, improving issues related to wake-up failures or accidental wake-ups, and enhancing the user experience.

The driving device for the touch panel provided in this application not only prevents screen flashing after the LPWG mode but also minimizes disturbances from high voltage signals to the touch scanning signals, thereby improving the touch scanning accuracy of the LPWG mode, reducing wake-up failures or accidental wake-ups, and enhancing the user experience.

The display apparatus provided in this application does not easily exhibit screen flashing when the screen is illuminated after exiting the LPWG mode, and the wake-up accuracy of the LPWG mode is high, offering a superior user experience.

BRIEF DESCRIPTION OF DRAWINGS

To clearly illustrate the technical solutions in the embodiments of the present application, the following is a brief introduction to the drawings used in the description of the embodiments. Evidently, the drawings described below are just some embodiments of this application, and those skilled in the art can derive other drawings from these without engaging in creative labor.

FIG. 4 is a process flow diagram of a driving method for a touch panel, according to one embodiment of the present application.

DETAILED DESCRIPTION OF EMBODIMENTS

Figure 1:
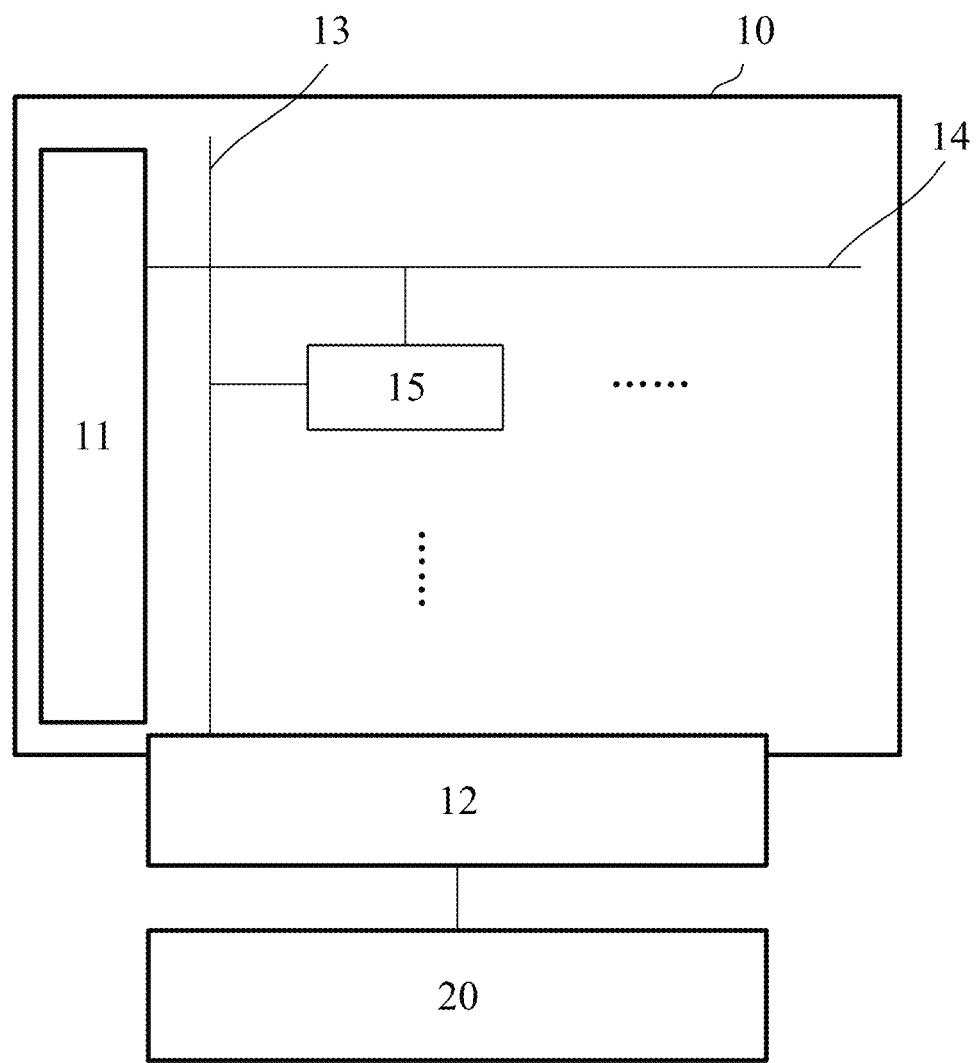
FIG. 1 is a schematic structural diagram of a display apparatus according to one embodiment of the present application.

In conjunction with the accompanying drawings and with reference to specific embodiments, a clear and complete description of the technical solutions in these embodiments of the present application is provided. It is evident that the described embodiments are only part of this application and not all of the embodiments. All other embodiments derived by those skilled in the art without creative effort fall within the scope of this application.

In the description of the present application, it is important to understand that terms such as "up," "down," "front," "back," "left," "right," "top," "bottom," "inside," and "outside" indicate orientations or positional relationships based on those shown in the drawings. These terms are used solely for the ease of describing this application and simplifying the discourse, not to imply that the devices or components must possess specific orientations, be constructed and operated in specific orientations, and therefore should not be construed as limiting this application. Additionally, terms like "first" and "second" are used for descriptive purposes only and do not indicate or imply relative importance or implicitly specify the number of technical features indicated. Hence, features labeled as "first" and "second" may explicitly or implicitly include one or more such features. In this application, "multiple" means two or more, and "at least one" can mean one, two, or more, unless otherwise specifically defined.

Refer to FIG. 1, which is a schematic structural diagram of a display apparatus in one embodiment of the present application. The display apparatus includes a touch panel 10 and a driving device 20. The touch panel 10 includes a gate driver circuit 11, a source driver circuit 12, data lines 13, scan lines 14, and pixel units 15. The gate driver circuit 11 provides scan drive signals to the scan lines 14, while the source driver circuit 12 provides data signals to the data lines 13. The scan drive signals and the data signals are used to drive the pixel units 15 to illuminate. The driving device 20 supplies the respective input signals to both the gate driver circuit 11 and the source driver circuit 12, as well as common voltage signals to a common electrode (i.e., VCOM electrode) of the touch panel 10. It is understood that the gate driver circuit 11 can be represented as a Gate on Array (GOA) circuit 11. It should be noted that the driving device 20 can be implemented within a timing controller (TCON).

In the present embodiment, the touch panel 10 can be an amorphous silicon LCD panel integrated with touch functionality, allowing users to perform gesture operations on the touch panel 10 to activate or use its various features. Typically, the touch panel 10 features a low power wake-up gesture (LPWG) mode. In the LPWG mode, the touch panel 10 includes a first stage and a second stage that follows the first stage. The first stage is characterized as a touch scanning stage, also known as a scanning stage; the second stage is characterized as a stage of pulling up signal potential, known as the All Gate On stage. The All Gate On stage serves to release the accumulated charge within the panel to prevent screen flashing or flickering upon waking.

In some examples, under the LPWG mode, the touch panel 10 also includes a third stage before the first stage, with the third, first, and second stages alternating in sequence. The third stage is characterized as a stage of stopping the touch scanning, termed a non-scanning stage. This means the scanning cycle includes the third stage, the first stage, and the second stage, continuing in a loop from the third stage to the first stage to the second stage and back to the third stage, etc., until the screen is woken up.

In some examples, under the LPWG mode, the touch panel 10 also includes a sleep stage. The sleep stage represents an initial screen-off phase upon entering the LPWG mode, termed a Sleep-in stage. The sleep stage precedes the first third stage. This means that after entering the LPWG mode, the device first enters the sleep stage, and then cycles through the third stage, the first stage, the second stage, and repeats this sequence—third stage, first stage, second stage, and so on—continuously looping in this order until the screen is woken up.

It is understood that after capturing a gesture operation during the first stage, the touch panel 10 proceeds to complete the second stage, then wakes up and illuminates the screen, and exits the LPWG mode. A duration of each stage can be preset, and this application does not specify exact durations for these stages.

Exemplarily, the touch panel 10 can enter the LPWG mode in response to a user's first gesture operation. The first gesture operation may involve pressing a power button or a pre-set screen-off gesture, among others; however, this application does not limit itself to specific gestures. Upon entering the LPWG mode, the touch panel 10 switches to a screen-off state but can still perform touch scanning.

Additionally, the touch panel 10 can respond to a user's second gesture operation to exit the LPWG mode and enter a touch display mode. Upon entering the touch display mode, the touch panel 10 switches to an illuminated state. The second gesture operation may include a double-tap on the touch panel 10 or other pre-set wake-up gestures; this application does not limit itself to any particular gesture.

Figure 2:
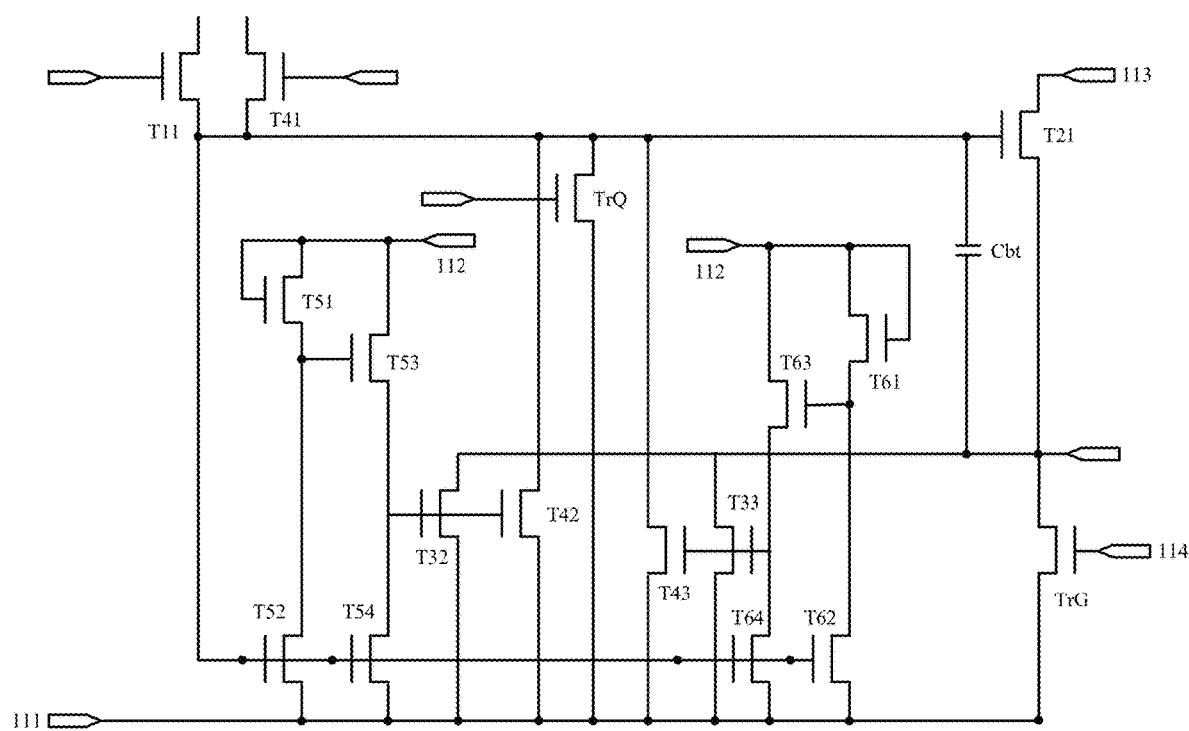
FIG. 2 is a schematic structural diagram of an exemplary gate driver circuit according to one embodiment of the present application.

Refer to FIG. 2, which shows a schematic diagram of an exemplary gate driver circuit provided in this embodiment. In some examples, the gate driver circuit 11 includes a first signal terminal 111, two second signal terminals 112, a third signal terminal 113, and a fourth signal terminal 114. The first signal terminal 111 is used to input a low voltage signal VGL, the two second signal terminals 112 are used to input latch signals LC1 and LC2 respectively, the third signal terminal 113 is used to input a clock signal CK, and the fourth signal terminal 114 is used to input a reset signal RESET. The gate driver circuit 11 includes transistors T11, T21, T32, T33, T41, T42, T43, T51, T52, T53, T54, T61, T62, T63, T64, TrQ, TrG, and a capacitor Cbt. A start pulse signal STV serves as an initial pulse signal for transistor T1, and thus is not depicted in this gate driver circuit 11.

It is understood that apart from the example structure mentioned, the gate driver circuit 11 can also adopt other structures, and the application does not specifically limit this.

Figure 3:
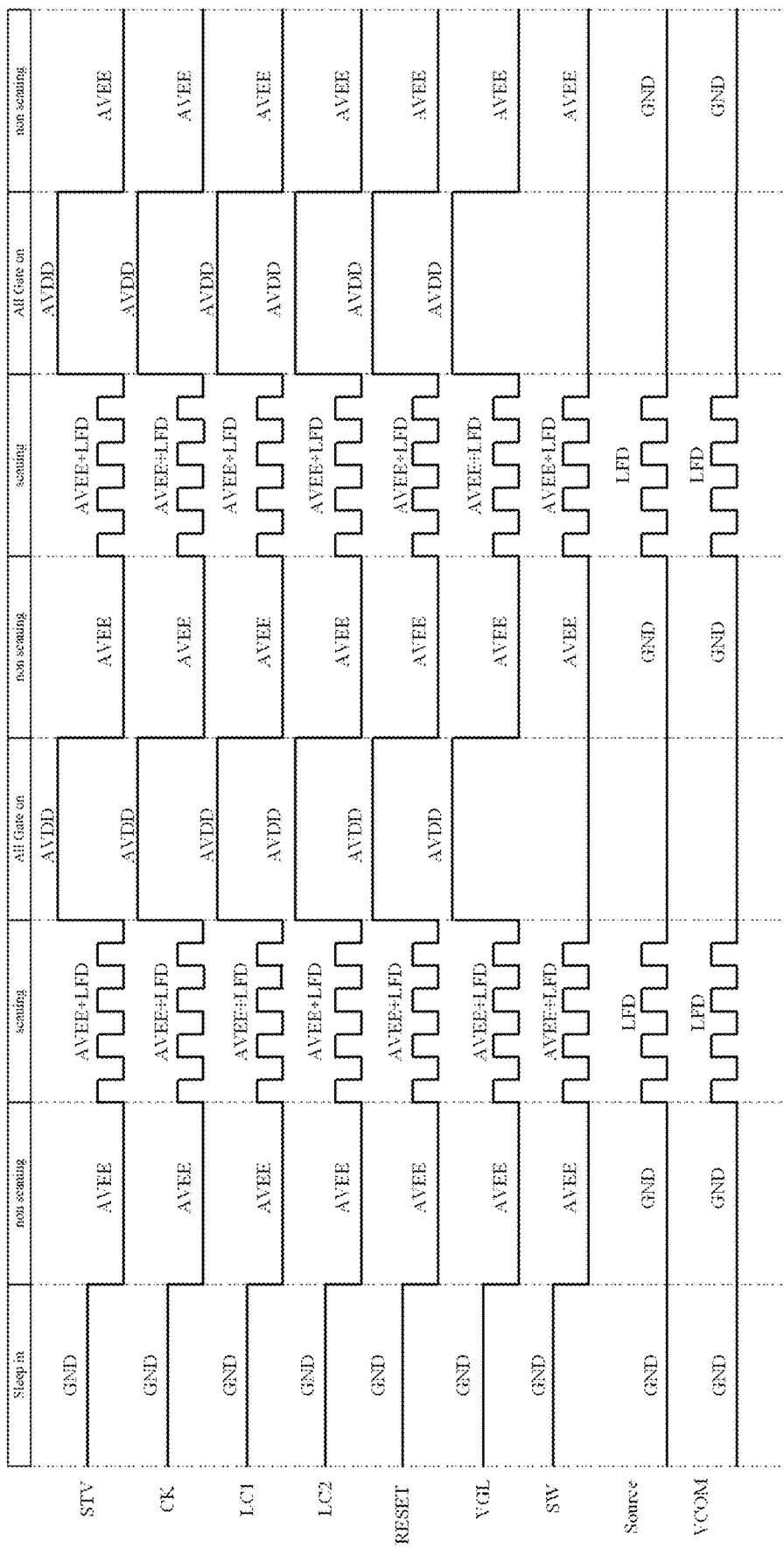
FIG. 3 is a schematic diagram of a driving timing for signals under a low power wake-up gesture (LPWG) mode, according to one embodiment of the present application.

As a precursor to this embodiment, a driving timing sequence for LPWG mode is provided. Please refer to FIG. 3, which illustrates a schematic diagram of the driving timing for signals under the LPWG mode provided in this embodiment. Exemplarily, during the Sleep-in stage, the start pulse signal STV, the clock signal CK, the latch signals LC1 and LC2, the reset signal RESET, and the low voltage signal VGL provided to the gate driver circuit, as well as the switch signal SW, the data signal Source, and the common voltage signal VCOM provided to the touch panel, are all at GND voltage (ground voltage). In the non-scanning stage, the start pulse signal STV, the clock signal CK, the latch signals LC1 and LC2, the reset signal RESET, the low voltage signal VGL, and the switch signal SW are all at AVEE voltage (negative voltage), while the data signal Source and the common voltage signal VCOM remain at GND voltage, which is typically 0V. During the scanning stage, the start pulse signal STV, the clock signal CK, the latch signals LC1 and LC2, the reset signal RESET, the low voltage signal VGL, and the switch signal SW are all superimposed with a touch scanning signal LFD on top of the AVEE voltage, while the data signal Source and the common voltage signal VCOM are superimposed with a touch scanning signal LFD on top of the GND voltage. Here, the touch scanning signal LFD is used to capture gesture signals for gesture wake-up. In the All Gate On stage, the start pulse signal STV, the clock signal CK, the latch signals LC1 and LC2, the reset signal RESET, and the low voltage signal VGL are all at AVDD voltage (positive voltage), the switch signal SW is at AVEE voltage, and the data signal Source and the common voltage signal VCOM remain at GND voltage. The voltages AVDD, GND, and AVEE decrease in sequence.

However, it has been discovered that during use, the LPWG mode is prone to noise during a touchscreen phase, known as TP Noise. This is often due to insufficient driving capacity of integrated circuits (ICs) in the LPWG mode, which leads to changes in the waveform of the touch scanning signals, and these signals are easily disturbed by high voltage signals. The noise during the touchscreen phase can result in the touch panel 10 failing to register touches or registering false touches, which can lead to unresponsive or false screen touches, subsequently causing wake-up failures or accidental activations, thereby affecting the user experience with touch panel 10.

In light of this, the present embodiment provides a driving method for the touch panel that optimizes the driving timing in the LPWG mode further, aiming to mitigate the disturbances caused by high voltage signals to the touch scanning signals during the second stage. This not only prevents screen flashing or flickering issues after exiting the LPWG mode but also reduces the disturbances from high voltage signals to the touch scanning signals, improving issues related to failed or accidental wake-ups and enhancing the product usage experience, thus resolving at least some of the aforementioned problems.

Figure 5:
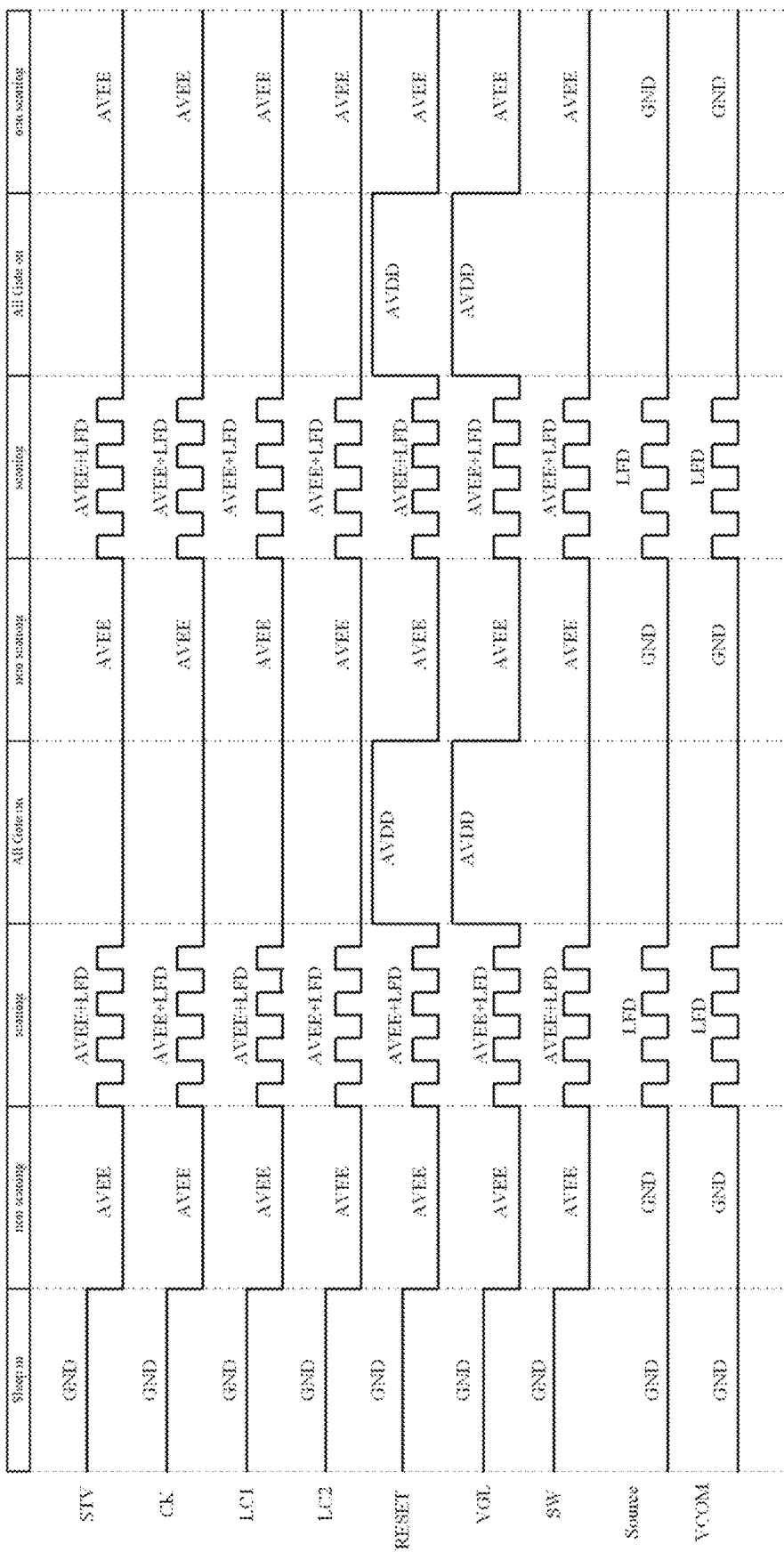
FIG. 5 is a schematic diagram of another driving timing for signals under the LPWG mode, according to one embodiment of the present application.

Please also refer to FIGS. 4 and 5, where FIG. 4 illustrates a process flow diagram of the driving method for the touch panel in this embodiment, and FIG. 5 shows a schematic diagram of another driving timing for signals under the LPWG mode according to one embodiment of the present application. The driving method includes the following steps:

Step 401: In response to confirming the transition of the touch panel from the first stage to the second stage, control the reset signal and the low voltage signal provided to the gate driver circuit to switch to first level signals.

In some examples, the first level signal is a positive voltage signal, namely the AVDD signal, and the voltage of the first level signal is at AVDD voltage. That is to say, when the touch panel switches from the scanning stage to the All Gate On stage, the voltage of the reset signal RESET and the voltage of the low voltage signal VGL are switched to AVDD voltage. Thus, during the All Gate On stage, the reset signal RESET and the low voltage signal VGL can still release the accumulated charge within the panel, serving to clear the charge and prevent screen flashing or flickering issues when the touch panel wakes up from the LPWG mode.

Step 402: Control the start pulse signal, the clock signal, and the latch signals provided to the gate driver circuit to switch to second level signals, where the voltage of the first level signal is higher than the voltage of the second level signal.

In some examples, the second level signal is a negative voltage signal, namely the AVEE signal, and the voltage of the second level signal is AVEE voltage. That is to say, when the touch panel switches from the scanning stage to the All Gate On stage, the voltages of the start pulse signal STV, the clock signal CK, and the latch signals LC1 and LC2 are switched to AVEE voltage.

It should be noted that the sequence of execution between Step 401 and Step 402 is not restricted.

Through the above solution, by lowering the potentials of the start pulse signal STV, the clock signal CK, and the latch signals LC1 and LC2, it is possible to reduce the disturbances caused by high voltage signals to the touch scanning signals, thereby enhancing the touch scanning accuracy in the LPWG mode, improving issues related to frequent wake-up failures or accidental wake-ups, and enhancing the product usage experience.

Figure 6:
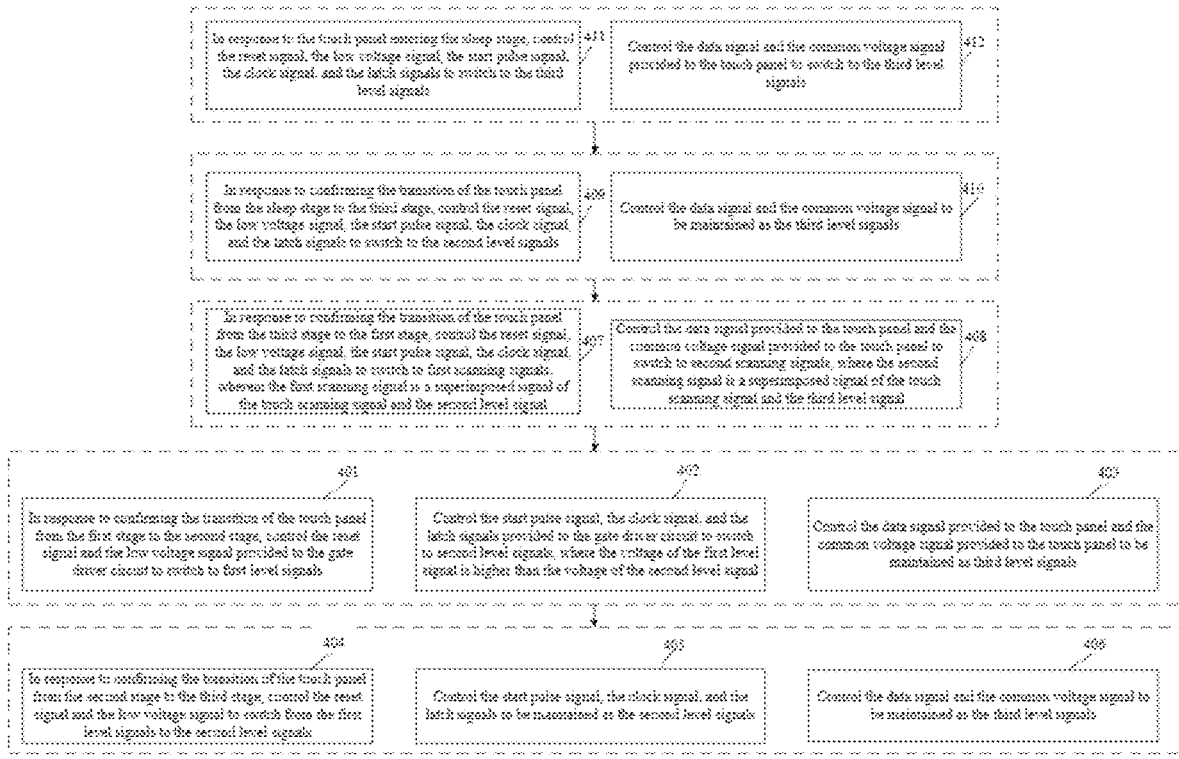
FIG. 6 is a process flow diagram of the driving method for the touch panel, according to one embodiment of the present application.

Please refer to FIG. 6, which illustrates a detailed process flow diagram of the driving method for the touch panel in this embodiment. In some embodiments, while executing Steps 401 and 402, the following can also be included:

Step 403: Control the data signal provided to the touch panel and the common voltage signal provided to the touch panel to maintain as third level signals.

It should be noted that the order of execution of Step 403 with Steps 401 and 402 is not restricted.

In some examples, the third level signal is a ground signal, namely the GND signal, and the voltage of the third level signal is GND voltage. That is to say, when the touch panel switches from the scanning stage to the All Gate On stage, the voltage of the data signal Source and the voltage of the common voltage signal VCOM are maintained at GND voltage. This approach helps reduce disturbances from high voltage signals to the touch scanning signals, thereby enhancing the touch scanning accuracy in LPWG mode.

In some embodiments, the driving method can include the following steps after Steps 401 and 402:

Step 404: In response to confirming the transition of the touch panel from the second stage to the third stage, control the reset signal and the low voltage signal to switch from the first level signals to the second level signals.

Step 405: Control the start pulse signal, the clock signal, and the latch signals to maintain as the second level signals.

Step 406: Control the data signal and the common voltage signal to maintain as the third level signals.

Specifically, when the touch panel transitions from the All Gate On stage to the non-scanning stage, control the start pulse signal STV, the clock signal CK, the latch signals LC1 and LC2, the reset signal RESET, and the low voltage signal VGL to be at AVEE voltage, and control the data signal Source and the common voltage signal VCOM to be at GND voltage, until the end of the non-scanning stage. This approach helps to reduce disturbances from high voltage signals to the touch scanning signals, thereby enhancing the touch scanning accuracy in the LPWG mode.

In some embodiments, before Step 401, the driving method can also include the following steps:

Step 407: In response to confirming the transition of the touch panel from the third stage to the first stage, control the reset signal, the low voltage signal, the start pulse signal, the clock signal, and the latch signals to switch to first scanning signals, wherein the first scanning signal is a superimposed signal of the touch scanning signal and the second level signal.

In some examples, the touch scanning signal LFD is a pulse square wave signal. This allows for capturing gesture operations with regular pulse square waves, thus achieving better gesture recognition accuracy.

Step 408: Control the data signal provided to the touch panel and the common voltage signal provided to the touch panel to switch to second scanning signals, where the second scanning signal is a superimposed signal of the touch scanning signal and the third level signal.

Specifically, when the touch panel transitions from the non-scanning stage to the scanning stage, control the reset signal RESET, the low voltage signal VGL, the start pulse signal STV, the clock signal CK, and the latch signals LC1 and LC2 to each be a superimposed signal of the AVEE voltage and the touch scanning signal LFD. Also, control the data signal Source and the common voltage signal VCOM to each be a superimposed signal of the GND voltage and the touch scanning signal LFD until the scanning stage ends. Thus, during the scanning stage, each output signal is superimposed with the touch scanning signal LFD, allowing for normal high-precision touch scanning that is less susceptible to disturbances, thereby facilitating accurate and sensitive recognition of wake-up gestures.

In some embodiments, before Step 407, the driving method can also include the following steps:

Step 409: In response to confirming the transition of the touch panel from the sleep stage to the third stage, control the reset signal, the low voltage signal, the start pulse signal, the clock signal, and the latch signals to switch to the second level signals.

Step 410: Control the data signal and the common voltage signal to be maintained as the third level signals.

Specifically, when the touch panel transitions from the Sleep-in stage to the non-scanning stage, control the start pulse signal STV, the clock signal CK, the latch signals LC1 and LC2, the reset signal RESET, and the low voltage signal VGL to be at AVEE voltage, and control the data signal Source and the common voltage signal VCOM to be at GND voltage, until the non-scanning stage ends.

In some embodiments, before Step 409, the driving method can also include the following steps:

Step 411: In response to the touch panel entering the sleep stage, control the reset signal, the low voltage signal, the start pulse signal, the clock signal, and the latch signals to switch to the third level signals.

Step 412: Control the data signal and the common voltage signal provided to the touch panel to switch to the third level signals.

Specifically, when the touch panel enters the Sleep-in stage, control the start pulse signal STV, the clock signal CK, the latch signals LC1 and LC2, the reset signal RESET, the low voltage signal VGL, the data signal Source, and the common voltage signal VCOM to be at GND voltage, until the Sleep-in stage ends.

In some embodiments, the driving method can also include:

In response to confirming the touch panel's entry into the Sleep-in stage, control the switch signal SW to switch to the third level signal, that is, control the switch signal SW to be at GND voltage, until the Sleep-in stage ends. In response to confirming the touch panel's transition from the Sleep-in stage to the third stage (non-scanning), control the switch signal SW to switch to the second level signal, that is, control the switch signal SW to switch to AVEE voltage, until the non-scanning stage ends. In response to confirming the touch panel's transition from the third stage (non-scanning) to the first stage (scanning), control the switch signal SW to switch to the first scanning signal, that is, control the switch signal SW to be a superimposed signal of the touch scanning signal LFD and AVEE voltage, until the scanning stage ends. In response to confirming the touch panel's transition from the first stage (scanning) to the second stage (All Gate on), control the switch signal SW to switch to the second level signal, that is, control the switch signal SW to switch to AVEE voltage, until the All Gate on stage ends. In response to confirming the touch panel's transition from the second stage (All Gate on) to the third stage (non-scanning), control the switch signal SW to be maintained as the second level signal, that is, control the switch signal SW to maintain AVEE voltage, until the non-scanning stage ends, then switch to the scanning stage, and so on in a continuous cycle. This arrangement prevents the timing sequence of the switch signal SW from affecting the timing sequences of other signals within the panel.

In some embodiments, the driving method of this embodiment also includes:

In the LPWG mode, in response to the touch panel detecting a second gesture operation, after the second gesture operation and the subsequent end of the second stage (the All Gate On stage), control the touch panel to exit the LPWG mode and enter the normal display mode, while continuing to provide various signals needed for the normal display mode.

It is understood that the driving method provided by this embodiment allows the reset signal and the low voltage signal during the second stage to continue clearing the charges, preventing screen flashing or flickering when the screen is lit after exiting the LPWG mode. Moreover, by lowering the voltages of the start pulse signal, the clock signal, and the latch signals, it reduces disturbances from high voltage signals to the touch scanning signals, thereby enhancing the touch scanning accuracy in the LPWG mode, improving situations where wake-up fails or occurs accidentally, and enhancing the user experience.

Figure 7:
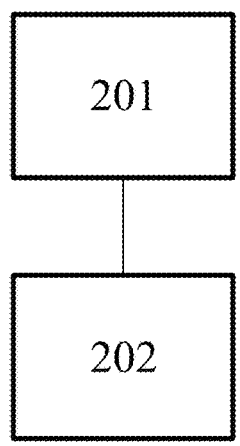
FIG. 7 is a schematic structural diagram of a driving device for the touch panel, according to one embodiment of the present application.

Correspondingly, the present embodiment also provides a driving device for the touch panel. Please refer to FIG. 7, which shows a schematic diagram of the driving device for the touch panel provided in this embodiment. The driving device 20 includes a first timing control module 201 and a second timing control module 202.

The first timing control module 201 is used to respond to the confirmation of the touch panel transitioning from the first stage to the second stage, controlling the reset signal and the low voltage signal provided to the gate driver circuit to switch to the first level signals.

The second timing control module 202 is used to control the start pulse signal, the clock signal, and the latch signals provided to the gate driver circuit to switch to the second level signals, where the voltage of the first level signal is higher than the voltage of the second level signal.

In some embodiments, in the low power wake-up gesture (LPWG) mode, the touch panel also includes a third stage before the first stage. The third stage represents a stage where touch scanning is stopped. The third stage, the first stage, and the second stage are set in an alternating sequence. The first timing control module 201 is also used to:

Respond to confirmation of the touch panel transitioning from the second stage to the third stage by controlling the reset signal and the low voltage signal to switch from the first level signals to the second level signals.

The second timing control module 202 is also used to maintain the start pulse signal, the clock signal, and the latch signals as the second level signals.

In some embodiments, the first timing control module 201 and the second timing control module 202 also:

Respond to confirmation of the touch panel transitioning from the third stage to the first stage by controlling the reset signal, the low voltage signal, the start pulse signal, the clock signal, and the latch signals to switch to the first scanning signals, where the first scanning signal is a superimposed signal of the touch scanning signal and the second level signal.

In some embodiments, the driving method also includes a third timing control module, which is used for:

Responding to confirmation of the touch panel transitioning from the third stage to the first stage by controlling the data signal provided to the touch panel and the common voltage signal provided to the touch panel to switch to the second scanning signals. The second scanning signal is a superimposed signal of the touch scanning signal and the third level signal, where the voltage of the third level signal is higher than the voltage of the second level signal but lower than the voltage of the first level signal.

In some embodiments, the touch scanning signal is a pulse square wave signal.

In some embodiments, under the low power wake-up gesture (LPWG) mode, the touch panel also includes a sleep stage, which is positioned before the first third phase. The first timing control module 201 and the second timing control module 202 also:

Respond to confirmation of the touch panel transitioning from the sleep stage to the third phase by controlling the reset signal, the low voltage signal, the start pulse signal, the clock signal, and the latch signals to switch to the second level signals.

In some embodiments, the first timing control module 201 and the second timing control module 202 also:

Respond to the touch panel entering the sleep stage by controlling the reset signal, the low voltage signal, the start pulse signal, the clock signal, and the latch signals to switch to the third level signals, where the voltage of the third level signal is higher than the voltage of the second level signal but lower than the voltage of the first level signal.

In some embodiments, the third timing control module is also used for:

Responding to the touch panel entering the sleep stage by controlling the data signal provided to the touch panel and the common voltage signal provided to the touch panel to switch to the third level signals;

Responding to confirmation of the touch panel transitioning from the sleep stage to the third stage, or responding to confirmation of the touch panel transitioning from the first stage to the second stage, or responding to confirmation of the touch panel transitioning from the second stage to the third stage, by maintaining the data signal provided to the touch panel and the common voltage signal provided to the touch panel as the third level signals.

In some embodiments, the first level signal is a positive voltage signal, the second level signal is a negative voltage signal, and the third level signal is a ground signal.

It is understood that the driving device for the touch panel in this embodiment not only prevents screen flashing or flickering when the screen is illuminated after the LPWG mode but also reduces disturbances from high voltage signals to the touch scanning signals, thereby enhancing the touch scanning accuracy in the LPWG mode, improving situations where wake-up fails or occurs accidentally, and enhancing the product usage experience.

Accordingly, the display apparatus in this embodiment do not easily exhibit screen flashing or flickering when illuminated after the LPWG mode, and the wake-up accuracy in the LPWG mode is relatively high, providing a better user experience.

The display apparatus of the present application can be a smartphone, a tablet, a television, a monitor, a laptop, a digital photo frame, a navigation device, or any other products or components with display capabilities.

The above detailed introduction to the driving method and the driving device for the touch panel, and the display apparatus provided by the present application has employed specific examples to explain the principles and implementation methods of this application. The explanations of these embodiments are intended to help understand the technology solutions and core ideas of this application; those skilled in the art should understand that they can still modify the technical solutions described in the aforementioned embodiments, or equivalently substitute some of the technical features; and these modifications or substitutions do not depart from the scope of the technical solutions of the embodiments of this application.

What is claimed is:

1. A driving method for a touch panel, wherein the touch panel comprises a low power wake-up gesture (LPWG) mode; in the LPWG mode, the touch panel comprises a first stage and a second stage after the first stage, the first stage is a stage for touch scanning, the second stage is a stage for elevating signal potential, and the touch panel comprises a gate driver circuit; the driving method comprises:
   in response to confirmation of the touch panel transitioning from the first stage to the second stage, controlling a reset signal and a low voltage signal provided to the gate driver circuit to each switch to a first level signal; and
   controlling a start pulse signal, a clock signal, and a latch signal provided to the gate driver circuit to each switch to a second level signal, where a voltage of the first level signal is greater than a voltage of the second level signal,
   wherein the touch panel in the LPWG mode further comprises a third stage before the first stage, the third stage is a stage of stopping touch scanning, the third stage, the first stage, and the second stage are set in an alternating sequence, the driving method further comprises:
   in response to confirmation of the touch panel transitioning from the second stage to the third stage, controlling the reset signal and the low voltage signal to each switch from the first level signal to the second level signal; and
   controlling the start pulse signal, the clock signal, and the latch signal to be maintained as the second level signals.

2. The driving method for the touch panel according to claim 1, wherein the driving method further comprises:
   in response to confirmation of the touch panel transitioning from the third stage to the first stage, controlling the reset signal, the low voltage signal, the start pulse signal, the clock signal, and the latch signal to each switch to a first scanning signal, wherein the first scanning signal is a superimposed combination of a touch scanning signal and the second level signal.

3. The driving method for the touch panel according to claim 2, wherein the driving method further comprises:
   in response to confirmation of the touch panel transitioning from the third stage to the first stage, controlling a data signal provided to the touch panel and a common voltage signal provided to the touch panel to each switch to a second scanning signal, wherein the second scanning signal is a superimposed combination of the touch scanning signal and a third level signal, and a voltage of the third level signal is greater than the voltage of the second level signal and less than the voltage of the first level signal.

4. The driving method for the touch panel according to claim 2, wherein the touch scanning signal is a pulse square wave signal.

5. The driving method for the touch panel according to claim 1, wherein the touch panel in the LPWG mode further comprises a sleep stage, and the sleep stage is before the initial third stage; the driving method further comprises:
   in response to confirmation that the touch panel transitioning from the sleep stage to the third stage, controlling the reset signal, the low voltage signal, the start pulse signal, the clock signal, and the latch signal to each switch to the second level signal.

6. The driving method for the touch panel according to claim 5, wherein the driving method further comprises:
   in response to the touch panel entering the sleep stage, controlling the reset signal, the low voltage signal, the start pulse signal, the clock signal, and the latch signal to each switch to a third level signal, wherein a voltage of the third level signal is greater than the voltage of the second level signal and less than the voltage of the first level signal.

7. The driving method for the touch panel according to claim 6, wherein the driving method further comprises:
   in response to the touch panel entering the sleep stage, controlling a data signal provided to the touch panel and a common voltage signal provided to the touch panel to each switch to the third level signal; and
   in response to confirmation of the touch panel transitioning from the sleep stage to the third stage, or in response to confirmation of the touch panel transitioning from the first stage to the second stage, or in response to confirmation of the touch panel transitioning from the second stage to the third stage, controlling the data signal provided to the touch panel and the common voltage signal provided to the touch panel to be each maintained as the third level signal.

8. The driving method for the touch panel according to claim 6, wherein the first level signal is a positive voltage signal, the second level signal is a negative voltage signal, and the third level signal is a ground signal.

9. A driving device for a touch panel, wherein the touch panel comprises a low power wake-up gesture (LPWG) mode; in the LPWG mode, the touch panel comprises a first stage and a second stage after the first stage, the first stage is a stage for touch scanning, the second stage is a stage for elevating signal potential, and the touch panel comprises a gate driver circuit; the driving device comprises:
   a first timing control module that, in response to confirmation of the touch panel transitioning from the first stage to the second stage, controls a reset signal and a low voltage signal provided to the gate driver circuit to each switch to a first level signal; and
   a second timing control module that controls a start pulse signal, a clock signal, and a latch signal provided to the gate driver circuit to each switch to a second level signal, wherein a voltage of the first level signal is greater than a voltage of the second level signal,
   wherein the first timing control module further comprises:
   in response to confirmation of the touch panel transitioning from the second stage to a third stage, controlling the reset signal and the low voltage signal to each switch from the first level signal to the second level signal, wherein the third stage is before the first stage, the third stage is a stage of stopping touch scanning, and the third stage, the first stage, and the second stage are set in an alternating sequence.

10. The driving device for the touch panel according to claim 9, wherein the first timing control module and the second timing control module further comprise:

in response to confirmation of the touch panel transitioning from the third stage to the first stage, controlling the reset signal, the low voltage signal, the start pulse signal, the clock signal, and the latch signal to each switch to a first scanning signal, wherein the first scanning signal is a superimposed combination of a touch scanning signal and the second level signal.

11. The driving device for the touch panel according to claim 9, further comprising a third timing control module, the third timing control module comprising:

in response to confirmation of the touch panel transitioning from the third stage to the first stage, controlling a data signal provided to the touch panel and a common voltage signal provided to the touch panel to each switch to a second scanning signal, wherein the second scanning signal is a superimposed combination of a touch scanning signal and a third level signal, and a voltage of the third level signal is greater than the voltage of the second level signal and less than the voltage of the first level signal.

12. The driving device for the touch panel according to claim 9, wherein the second timing control module further comprises controlling the start pulse signal, the clock signal, and the latch signal to be maintained as the second level signals.

13. The driving device for the touch panel according to claim 9, wherein the touch scanning signal is a pulse square wave signal, the first level signal is a positive voltage signal, the second level signal is a negative voltage signal, and the third level signal is a ground signal.

14. A display apparatus, comprising a touch panel and a driving device for the touch panel, wherein the touch panel comprises a low power wake-up gesture (LPWG) mode; in the LPWG mode, the touch panel comprises a first stage and a second stage after the first stage, the first stage is a stage for touch scanning, the second stage is a stage for elevating signal potential, and the touch panel comprises a gate driver circuit; the driving device comprises:

a first timing control module that, in response to confirmation of the touch panel transitioning from the first stage to the second stage, controls a reset signal and a low voltage signal provided to the gate driver circuit to each switch to a first level signal; and a second timing control module that controls a start pulse signal, a clock signal, and a latch signal provided to the gate driver circuit to each switch to a second level signal, wherein a voltage of the first level signal is greater than a voltage of the second level signal, wherein the first timing control module further comprises:

in response to confirmation of the touch panel transitioning from the second stage to a third stage, controlling the reset signal and the low voltage signal to each switch from the first level signal to the second level signal, wherein the third stage is before the first stage, the third stage is a stage of stopping touch scanning, and the third stage, the first stage, and the second stage are set in an alternating sequence.

15. The display apparatus according to claim 14, wherein the first timing control module and the second timing control module further comprise:

in response to confirmation of the touch panel transitioning from the third stage to the first stage, controlling the reset signal, the low voltage signal, the start pulse signal, the clock signal, and the latch signal to each switch to a first scanning signal, wherein the first scanning signal is a superimposed combination of a touch scanning signal and the second level signal.

16. The display apparatus according to claim 14, further comprising a third timing control module, the third timing control module comprising:

in response to confirmation of the touch panel transitioning from the third stage to the first stage, controlling a data signal provided to the touch panel and a common voltage signal provided to the touch panel to each switch to a second scanning signal, wherein the second scanning signal is a superimposed combination of a touch scanning signal and a third level signal, and a voltage of the third level signal is greater than the voltage of the second level signal and less than the voltage of the first level signal.

17. The display apparatus according to claim 14, wherein the second timing control module further comprises controlling the start pulse signal, the clock signal, and the latch signal to be maintained as the second level signals.

\* \* \* \* \*